March 6, 1956 R. A. LAMBERTSON 2,737,490
FILTER FOR AQUARIA
Filed June 10, 1954 3 Sheets-Sheet 1
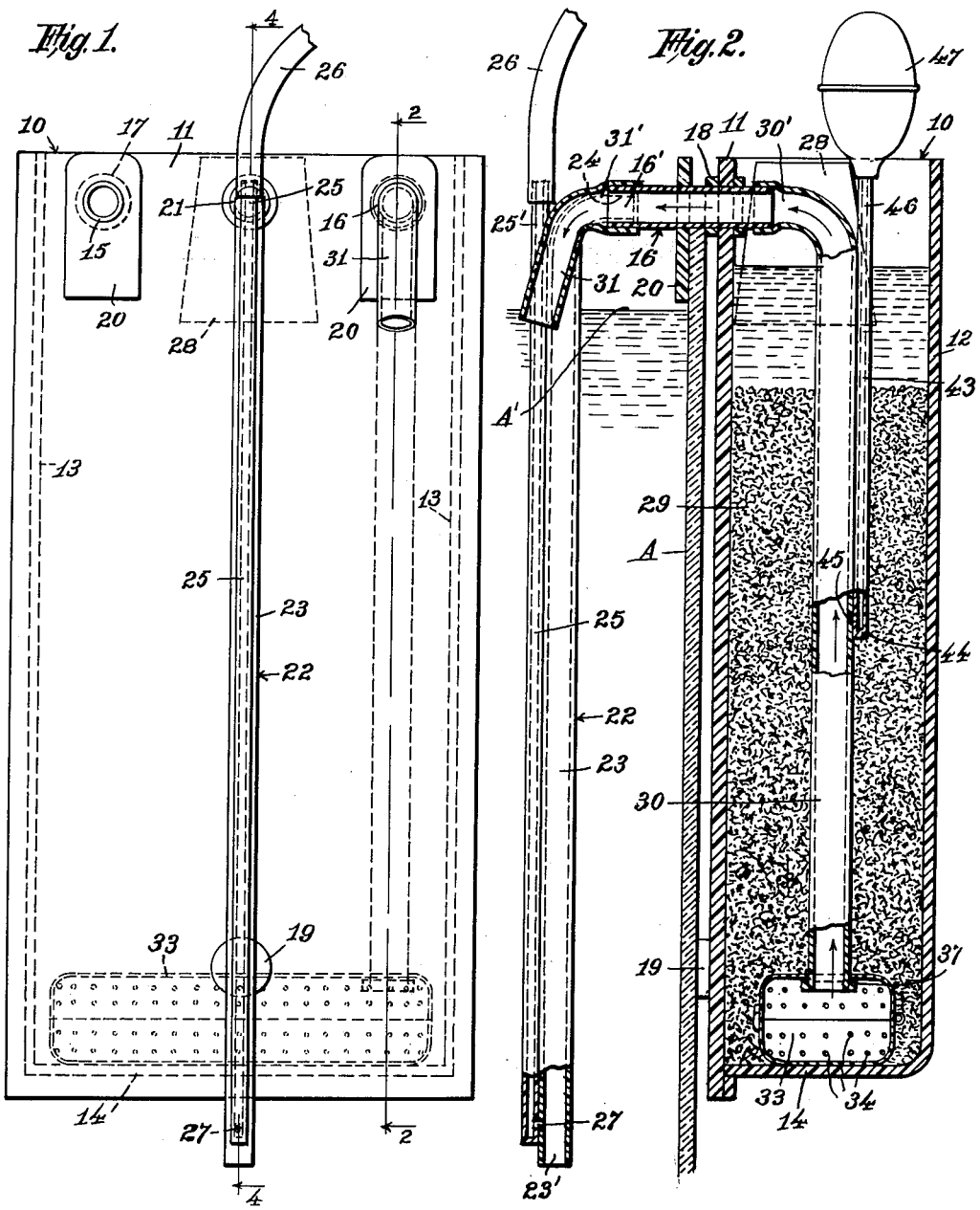
INVENTOR
Robert A. Lambertson
BY Howard S. Austin
ATTORNEY March 6, 1956   R. A. LAMBERTSON   2,737,490
FILTER FOR AQUARIA
Filed June 10, 1954   3 Sheets-Sheet 2
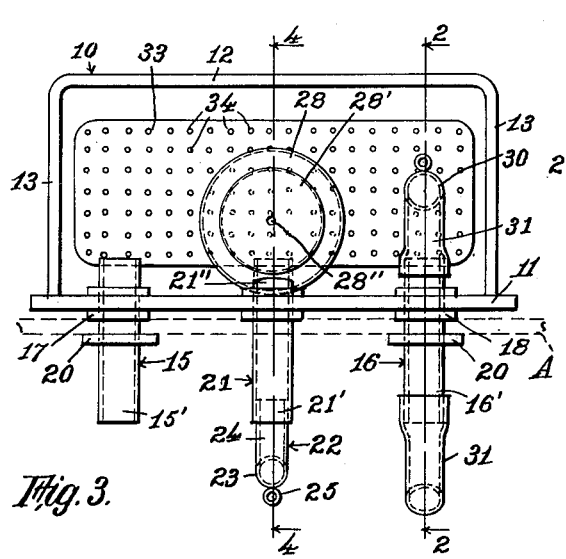
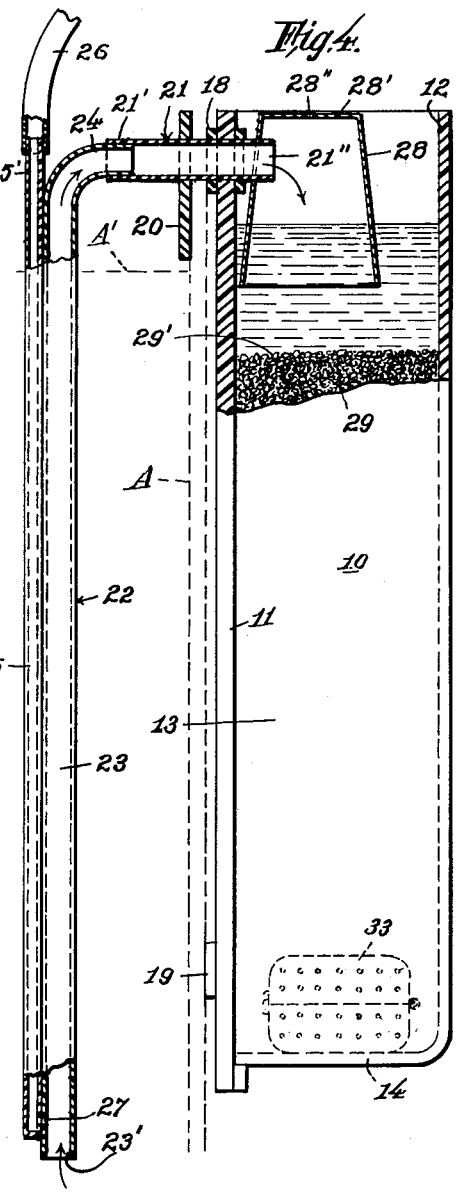
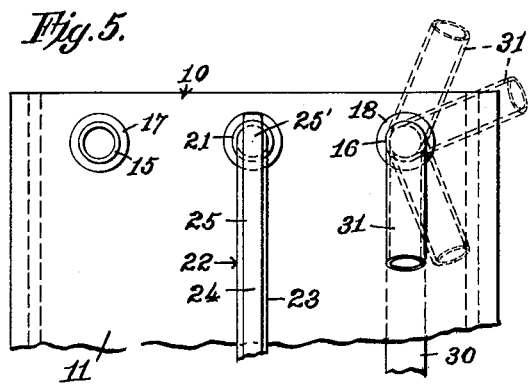
INVENTOR
Robert A. Lambertson
BY Howard S. Austin
ATTORNEY March 6, 1956  R. A. LAMBERTSON  2,737,490
FILTER FOR AQUARIA
Filed June 10, 1954  3 Sheets-Sheet 3
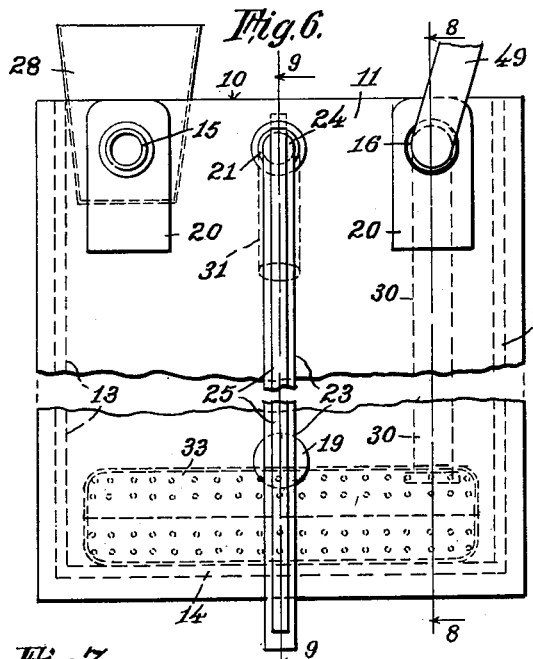
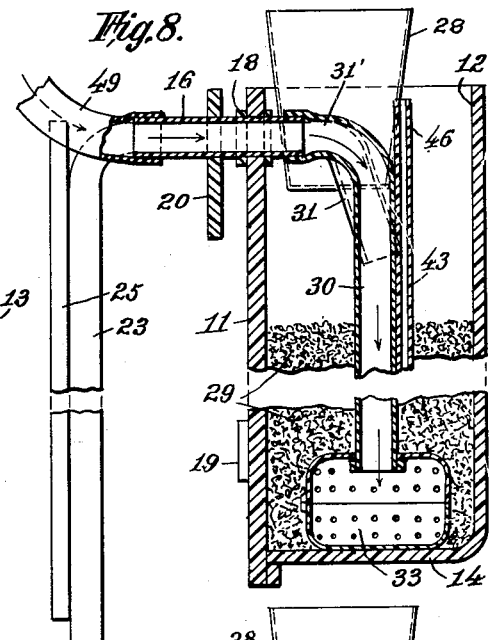
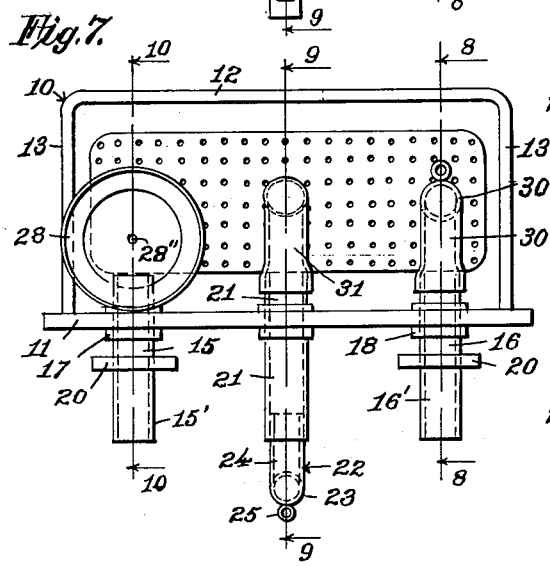
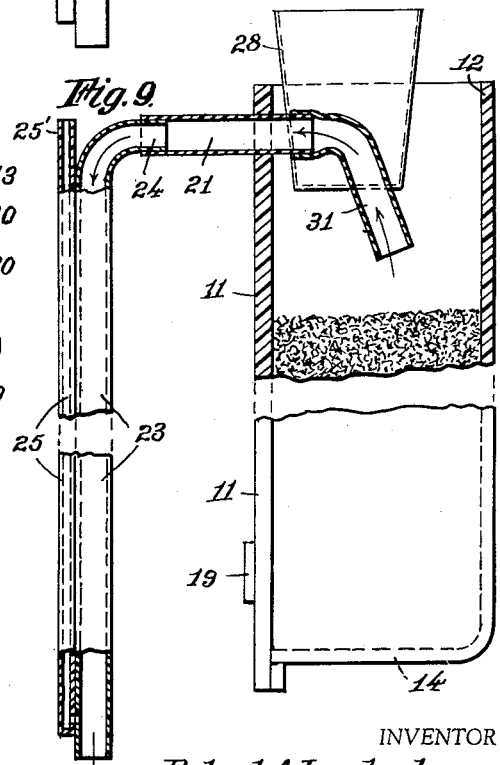
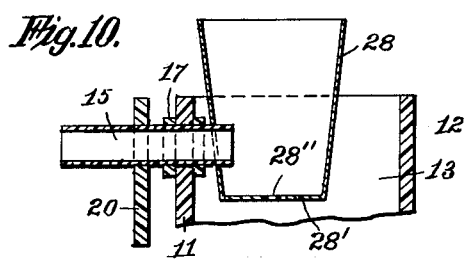
INVENTOR
Robert A. Lambertson
BY Howard S. Austin
ATTORNEY

United States Patent Office 2,737,490
Patented Mar. 6, 1956

2,737,490
FILTER FOR AQUARIA

Robert A. Lambertson, Winston-Salem, N. C.

Application June 10, 1954, Serial No. 435,687

10 Claims. (Cl. 210—16)

This invention relates to filters for maintaining the water of aquaria in a clean and wholesome condition; and particularly to filters of the type known as "outside filters," that is filters which are supported exteriorly of the aquarium with which it is used. In this type of filter the water of the aquarium is delivered to the top of the filter by means of a siphon, and percolates downwardly to the bottom of the filter from which it is returned to the aquarium by means of an air-lift designed for the purpose.

In the filter forming the subject matter of the present application, the water is delivered from the aquarium to the top of the filter by an air-lift, and the filtered water is returned from the lower portion of the filter to the aquarium by a siphon.

In filters for continuously cleansing the water of aquaria, the filtering material becomes progressively clogged, and when the water is delivered to the top of the filter by an air-lift, such clogging of the filter may result in an overflow of the device unless the filter is cleaned at necessary intervals.

An object of the invention is to provide a filter of the class stated which will circulate a large quantity of water from the aquarium to the filter, and back to the aquarium in comparison to the air pressure employed.

A further object of the invention is to provide a filter which may be readily cleaned by backwashing the same without the loss of filtering material.

A further object of the invention is to provide a filter of the type stated of such construction that the same will not overflow should the filter become clogged due to neglect or failure to properly clean the same at timely intervals.

A further object of the invention is to provide in a filter as stated, means for receiving the filtered water, and from which the filtered water may be continuously siphoned back into the aquarium.

A further object is to provide in a filter as stated, a receptacle for the filtered water, which receptacle may be readily removed from the device and thoroughly cleaned, when desired.

A further object of the invention is to provide in a filtering device of the class stated, a siphon equipped with means for starting the same either by air or water pressure.

A further object of the invention is to provide a combination filter and siphon in which the delivery leg of the siphon may be manipulated to prime the siphon independently of either air or water pressure.

A further and particular object of the invention is to provide an improved sectional siphon, forming an essential part of the filter combination, and of such construction that by a slight rearrangement of readily accessible sections or parts thereof, the siphon may be used either to return the filtered water to the aquarium, or to siphon the cleansing water from the upper portion of the filter during the process of backwashing.

Other objects will appear hereinafter.

With the above stated objects in view, the invention consists generally in a housing or tank designed to be supported upon, and exteriorly of, an aquarium wall, and adapted to contain filtering material, means for feeding the foul water from the aquarium to said tank above the filtering material therein, a receptacle or sump arranged in the lower portion of said tank to receive the filtered water, and a siphon for continuously returning the filtered water from said receptacle or sump into the aquarium.

The invention further consists in a tank and a receptacle or sump in the lower portion thereof, as above stated, and further characterized by a pair of substantially horizontal tubes extending through and fixed intermediate the ends thereof, in the upper portion of a wall of said tank, the outwardly projecting portions of said tubes being adapted to rest on the upper edge of the aquarium wall to support the filter, a siphon leg attached at the upper end thereof to the inner end of one of said tubes and with the lower end thereof communicating with the interior of said sump, and a siphon delivery leg attached to the opposite end of said tube and adapted to discharge the filtered water into the aquarium, and an air-lift for delivering water from the aquarium to the upper portion of the filter tank.

The invention further consists in the filter as above stated, in which the other of said horizontal tubes from that to which the siphon legs are connected, constitutes safety means for returning excess water back into the aquarium in the event of clogging of the filter.

The invention further consists in a device as above stated in which the means for delivering the water from the aquarium to the filter comprises a third tube similar to the first said horizontal tubes, and an air-lift attached to the outer end of said third tube and adapted to extend downwardly into the aquarium.

The invention further consists in the combination of elements as above stated, in which the delivery leg of the siphon as used during the filtering operation, may be removed from the outer end of the horizontal tube to which it is normally attached, and attached to the inner end of the horizontal tube to which the air-lift is attached, thereby, with said air lift, constituting a siphon to discharge the cleansing water from the upper portion of the filter tank when backwashing; at which time a hose is connected from a faucet to the end of the tube from which the said siphon leg has been removed.

The invention further consists in various details of construction and arrangements of parts will be described hereinafter.

The invention will be more clearly understood by reference to the accompanying drawings forming a part of this specification and in which:

Fig. 1 is a front elevation of a filter embodying the invention, the parts being arranged as used for filtering the water of an aquarium;

Fig. 2 is a vertical section on substantially the line 2—2 of Figs. 1 and 3;

Fig. 3 is a plan view of the device arranged as shown in Figs. 1 and 2;

Fig. 4 is a vertical section on substantially the line 4—4 of Figs. 1 and 3, the lower portion of the tank being illustrated in elevation;

Fig. 5 is a detail front elevation of the upper portion of the filter, illustrating a manner in which the delivery leg of the siphon may be manipulated to prime the same;

Fig. 6 is a front elevation of the filter with the parts arranged for backwashing the device;

Fig. 7 is a top plan view of the same;

Fig. 8 is a vertical section taken on substantially the line 8—8 of Figs. 6 and 7;

Fig. 9 is a vertical section on substantially the line 9—9 of Figs. 6 and 7;

Fig. 10 is a section on the line 10—10 of Fig. 7; and

Fig. 11 is a detail sectional view of the receiving member or sump, illustrating the same as opened for cleaning after having been removed from the housing.

Referring to the drawings, 10 indicates generally the filter tank which is open at the top, and preferably formed of transparent plastic. The tank 10 preferably comprises a front wall 11 which is to be arranged adjacent the aquarium when in position for use; a rear wall 12, side walls 13 and a bottom 14. The term "front wall" as used throughout the description and claims, refers to that wall of the tank which is arranged adjacent the aquarium when installed for use. Extending through, and firmly fixed intermediate their ends in the front wall 11, adjacent the upper edge thereof, is a pair of substantially horizontal tubes 15 and 16, the forwardly projecting portions $15^1$ and $16^1$ thereof, respectively, being adapted to rest upon the upper edge of the aquarium wall A to support the filter in operative position thereon. Collars 17 and 18 on the tubes 15 and 16 respectively, and a boss 19 on the lower portion of the wall 11, space the filter from the aquarium wall; and depending members 20, frictionally mounted upon the outwardly extending portions of said tubes, are adapted to engage the inner face of the aquarium wall A, to hold the filter firmly in position.

Arranged intermediate the tubes 15 and 16, and preferably at the same level therewith, is a similar tube 21, to the outer end of which is connected an air-lift 22 for delivering the foul water from the aquarium to the filter. The air lift 22 comprises a substantially vertical water tube 23 which is open at the lower end 23', and formed with a horizontal upper end 24 which preferably frictionally engages in the outer end 21' of the tube 21; and an air tube 25, the upper end 25' of which is adapted to be connected, as by flexible hose 26, to an air pump not shown. The lower end of the air tube communicates with the lower portion of the water tube 23 through an orifice 27. The operation of an air-lift per se, is well known in the art.

Upon the inner end 21" of the tube 21 is detachably mounted an anti-splash device which may be of any desired form, but preferably comprises an inverted cup-shaped member 28, the open end thereof preferably terminating a short distance above the top surface 29' of the filtering material 29, as illustrated in Figs. 2 and 4. The closed end 28' of the anti-splash device 28 is provided with a small aperture 28". The anti-splash member 28 is preferably formed of thin flexible plastic to frictionally hold the same in place and to facilitate rearrangement of the same as will be described hereinafter.

The filtering material 29 used in the filter is preferably fine granular carbon, although it is to be understood that a coarse lump carbon may be used, with a top layer of fibrous material such as glass wool, without departing from the scope of the invention.

The water delivered by the air-lift 22 percolates downwardly through the filtering material 29, and after having been cleansed thereby, is delivered back to the aquarium by means of a siphon. Said siphon includes a long tubular member 30 forming the receiving leg of the siphon, and a short tubular leg 31 constituting the delivery leg. The upper ends of the legs 30 and 31 are curved to form laterally extending portions 30' and 31' respectively, for detachably connecting the legs 30 and 31 to the inner and outer ends of either of the tubes 15 or 16, as preferred. By having the legs of the siphon detachably connectable to either of said tubes 15 or 16 an arrangement most convenient to the user may be readily made.

Located in the lower portion of the tank 10 is a receptacle or sump 33, preferably formed of plastic, the walls of which are foraminate in order that the filtered water may freely enter the sump; and the foramina 34 are sufficiently small to prevent carbon from entering therethrough. The lower end of the receiving leg 30 of the siphon, extends loosely through an aperture 35 in the upper wall 36 of the sump 33, and is provided with a collar 37 engaging the under face of said top wall; by which construction the receptacle may be readily removed from the tank 10 with and by the leg 30, when necessary for cleaning. The sump 33 extends transversely of the filter tank 10 between the side walls 13—13, thereof, and is of such dimensions as to permit the same to be readily placed within and removed from the tank; and by having the sump substantially swiveled to the lower end of tube 30, the tube may be readily arranged at either side of the tank and attached to either of the tubes 15 or 16.

The receptacle or sump 33 may be of any desired form, but is preferably substantially rectangular, and formed of upper and lower sections 38 and 39 respectively, which are preferably hingedly connected, as at 40. Suitable means, such as a latch 41, may be provided for normally holding the device closed, but permitting the same to be opened for cleaning.

The receiving leg 30 of the siphon is provided with means for starting the siphon into operation either by air or water pressure. To this end a small bore tube 43 is fixed to the upper portion of said leg and extends downwardly thereon approximately half the length of said leg, terminating in a closed end 44. A small duct 45 extends from the lower portion of the tube 43 into the bore of the leg 30; and an upwardly projecting end 46 of the tube 43 provides means for attaching a rubber bulb 47 thereto.

The operation of the device for filtering the water is as follows. After the filter has been placed in position on the side of the aquarium, the air pump (not shown) is started and delivers air through the tube or hose 26 to the air-lift 22, which in turn delivers the water from the aquarium to the upper portion of the filter tank 10 through the intermediate horizontal tube 21, as indicated by the arrows in Fig. 4. The water thus delivered to the filter percolates downwardly through the filter material 29 and into the sump 33. After the interstices between the filter particles are filled, the level of the water rises above the top surface 29' of the filter material. When the water level in the filter tank 10 rises appreciably above the level A' of the water in the aquarium, the siphonic action is started; which may be accomplished either by air pressure or water pressure.

To start the siphon by air pressure, the bulb 47 is quickly squeezed, which forces the water out of the leg 30 of the siphon in two directions simultaneously; the water above the small duct 45 being forced upwardly and into the tube 16 and the delivery leg 31; and some of the water in the leg below the duct 45 being expelled from the lower end of the tube 30. Air pressure on the water outside of the tube 30 will then force the water upwardly in tube 30 to fill the space thus formed, and the momentum will carry the same upwardly to the portion of water in the upper part of the siphon and thus start the siphon to continuously deliver the filtered water from the sump 33 to the aquarium. This method of starting the siphon is usually successful providing the end of the delivery leg is not submerged, and the level of the water in the filter tank 10 is sufficiently high with relation to horizontal tubular portion 16 of the siphon.

Should conditions prevail when the air pressure method is not effective, the siphon may be readily started by water pressure. By this method the bulb 47 is squeezed, as above described, but the release of the same is delayed until the water in the leg 30 has risen above the duct 45; after which release of the bulb will draw water therein, instead of air. One or more squeezes thereafter will force the water into the tube 16 and leg 31, thereby readily starting the siphonic action; and this will continue indefinitely as long as the water is supplied from the aquarium.

A third method may be used to start the siphon without using either air or water pressure. It will be noted that the detachable connection between the delivery leg 31 and the horizontal tube 15 or 16 to which it is attached, permits a rotary movement of said leg about the central axis of the tube 15 or 16, to which it is attached, as illustrated in dotted lines in Fig. 5. By turning said leg upwardly when the filter is being filled, the water from the sump 33 will rise in the leg; and by slowly turning the leg downwardly the leg will become filled with water and the siphonic action started.

However, after long continued use, the dirt and filth filtered from the water will progressively clog the filter until the water cannot pass through the filter as rapidly as it is delivered thereto. Under such circumstances, the excess water is returned by gravitational flow through the tube 15 or 16 to which the siphon elements are not attached, thereby avoiding an overflow of the device.

The filter may be readily cleaned by backwashing. To this end the device is removed from the aquarium; and certain of the elements are rearranged. The cup-shaped anti-splash member is removed from the inner end of the intermediate tube 21, and is placed upon the inner end of the tube 15 or 16 that has been used as a safety overflow, with the open end of said member up. The short delivery leg 31 of the siphon is removed from the outer end of the tube 15 or 16, to which it has been attached, and fixed upon the inner end of the intermediate tube 21. The leg 31 thus becomes the inlet leg, and the main tube 22 of the air-lift becomes the discharge leg of a siphon for discharging the cleansing water with the dirt and filth, from the upper portion of the filter tank.

A hose 49 leading from a tap or faucet, is connected to the outer end of the tube to which the tube 30 leading to the sump member 33 is connected. After the above changes have been made, and the water turned on, the water will pass downwardly through the tube 30 to the sump member 33 and rise through the filter material carrying the dirt and filth with it. The inverted anti-splash member 28 will prevent all but a minute quantity of water from flowing out the free tube 15 or 16, which will cause the water to rise above and fill the siphon formed as above described, thus starting the same into operation. A fine mesh strainer may be placed beneath the end of the air lift tube 22, which now becomes the discharge leg of the siphon above described, which strainer will allow for the passage of filth, but will retain the particles of fine granular carbon which may be lifted up by the water pressure and sucked out of the filter by the siphon.

I claim:

1. A filter of the class described comprising a tank adapted to contain filtering material and to be supported on and exteriorly of an aquarium, said tank including a front wall, a pair of laterally spaced substantially horizontal tubular members extending through the upper portion of said front wall at substantially the same level, means for continuously delivering the foul water from the aquarium to the upper portion of said tank, and siphon legs attached to the inner and outer ends of one of said tubular members for returning the filtered water from said tank to the aquarium, the other of said tubular members constituting a duct for returning any excess amount of water delivered to said tank, back into the aquarium.

2. A filter as set forth in claim 1 in which said siphon legs may be detachably secured to either of said tubular members.

3. A filter of the class described comprising a tank adapted to contain filtering material, said tank including a front wall, a pair of substantially horizontal tubes extending through the upper portion of said front wall with the axes thereof in the same horizontal plane with the outer portions thereof adapted to rest upon the upper edge of an adjacent aquarium wall, an air lift for delivering the foul water from the aquarium to the upper portion of said tank, a siphon leg attached to the inner end of one of said tubes and extending downwardly to adjacent the bottom of said tank, and a siphon delivery leg attached to the outer end of said tube for delivering the filtered water back into the aquarium, the other of said tubes constituting a duct for returning any excess amount of water delivered by said air lift back into the aquarium.

4. A filter of the class described comprising a tank adapted to contain filter material, said tank including a front wall, a pair of laterally spaced substantially horizontal tubes extending through and secured in the upper portion of said front wall with the outer portions thereof adapted to rest upon the upper edge of an aquarium wall, a third tube similar to the first said tubes and arranged intermediate the same, an air-life attached to the outer end of the last said tube and adapted to deliver the foul water from an aquarium to the upper portion of said tank above the filter material, and a pair of siphon legs attached to the inner and outer ends respectively of one of the first said tubes, for delivering the filtered water back into the aquarium.

5. A filter of the class described comprising a tank adapted to contain filter material, said tank including a front wall, a sump removably arranged in the lower portion of said tank and having foraminate walls, a pair of substantially horizontal tubes extending through said front wall at substantially the same level with the outer portions of said tubes adapted to rest upon the upper edge of an aquarium wall, a siphon leg attached to the inner end of one of said tubes and extending downwardly into communication with said sump, a siphon leg attached to the outer end the same said tube and adapted to deliver the filtered water from said sump into the aquarium, and an air-lift for delivering foul water from the aquarium into said tank above the filter material.

6. A filter as set forth in claim 5, in which said sump comprises an upper and a lower portion, and means for releasably holding said portions in closed relation.

7. A filter of the class described comprising a tank adapted to be supported on and exteriorly of an aquarium, said tank including a front wall, a pair of parallel tubular members extending through and fixed intermediate their ends in said wall and at substantially the same level, means for delivering water from the aquarium to the upper portion of said tank, a siphon receiving leg attached to the inner end of one of said tubes, and a delivery leg attached to the outer end of the same tube and rotatable about the horizontal axis thereof.

8. A filter as set forth in claim 7, in which said receiving leg and said delivery leg may be detachably mounted upon the ends of either of said tubes.

9. A filter of the class described comprising a tank adapted to be supported exteriorly of an aquarium, said tank including a front wall, a pair of tubular members extending through the upper portion of said wall at substantially the same level and secured therein intermediate their ends, a sump in the lower portion of said tank and extending transversely thereof, a siphon leg, a swivel connection between the lower end of said leg and said sump, the upper end of said leg being adapted to be detachably connected to the inner end of either of said tubular members and being detachably connected to the inner end of one of said members, a short delivery leg detachably connected to the outer end of the tubular member to which siphon leg is attached, and means for delivering the water from the aquarium to said tank.

10. A filter of the class described comprising a tank adapted to be supported exteriorly of an aquarium, said tank including a front wall and a bottom, a pair of tubular members extending through the upper portion of said front wall at substantially the same level and secured in said wall intermediate their ends, a sump resting on said bottom and extending substantially parallel with said front wall, a siphon leg, a swivel connection between the lower end of said leg and said sump adjacent one end of said sump, the upper end of said leg being horizontally extended and detachably connected to the inner end of one of said tubular members, and a short delivery leg connected to the outer end of the tubular member to which said siphon leg is attached, and means for delivering water from the aquarium to the upper portion of said tank.

References Cited in the file of this patent

UNITED STATES PATENTS

| | | |
|---|---|---|
| 1,727,554 | Millard | Sept. 10, 1929 |
| 2,293,051 | Duffy | Aug. 18, 1942 |
| 2,652,151 | Legus | Sept. 15, 1953 |